United States Patent [19]
Yoshida

[11] Patent Number: 5,514,313
[45] Date of Patent: May 7, 1996

[54] METHOD FOR PRODUCING CERAMIC LONG BODY

[75] Inventor: Toshihiro Yoshida, Nagoya, Japan

[73] Assignee: NGK Insulators, Ltd., Japan

[21] Appl. No.: 371,873

[22] Filed: Jan. 12, 1995

[30]     Foreign Application Priority Data

Feb. 21, 1994  [JP]  Japan ................................. 6-022656

[51] Int. Cl.$^6$ .................................................. C04B 35/00
[52] U.S. Cl. ............................................ 264/57; 264/66
[58] Field of Search ........................................ 264/57, 66

[56]            References Cited
          U.S. PATENT DOCUMENTS

| | | | |
|---|---|---|---|
| 1,513,617 | 10/1924 | Litt | 264/57 |
| 2,912,741 | 11/1959 | Bennett | 25/157 |
| 2,914,834 | 12/1959 | Daniel | 25/157 |
| 2,948,949 | 8/1960 | Schuffler et al. | 25/157 |
| 3,351,690 | 11/1967 | Stover | 264/57 |
| 4,330,496 | 5/1982 | Desplanches et al. | 264/57 |
| 4,731,207 | 3/1988 | Matsumoto et al. | 264/57 |
| 5,064,588 | 11/1991 | Misawa | 264/57 |

FOREIGN PATENT DOCUMENTS

| | | |
|---|---|---|
| 0164426 | 12/1985 | European Pat. Off. . |
| 720924 | 5/1942 | Germany . |
| 1239230 | 4/1967 | Germany . |
| 1646916 | 5/1972 | Germany . |
| 8417579 | 10/1984 | Germany . |
| 3841920 | 7/1990 | Germany . |
| 2-302373 | 12/1990 | Japan . |

*Primary Examiner*—Christopher A. Fiorilla
*Attorney, Agent, or Firm*—Parkhurst, Wendel & Burr

[57]             ABSTRACT

A method for producing a ceramic long body has the steps of: hanging a ceramic non-sintered body having a long shape inside a sheath so that said ceramic non-sintered body does not touch the sheath; firing the ceramic body at a temperature at which the ceramic body sinters until the sintering is completed to obtain a sintered ceramic body; hanging the sintered ceramic body upside down; and firing the sintered ceramic body again at a temperature at which the ceramic body sinters. The method gives a ceramic long body having little deformation, and the present invention can be suitably employed as a method for producing, for example, a heat transmitting tube a heat exchanger of a shell-and-tube type.

3 Claims, 2 Drawing Sheets

Position A

Position B

METHOD FOR PRODUCING CERAMIC LONG BODY

BACKGROUND OF THE INVENTION AND RELATED ART STATEMENT

The present invention relates to a method for producing a ceramic long body. The method is applicable to, for example, a method for producing a ceramic tubular body used as a heat transmitting tube of a heat exchanger of a shell-and-tube type or the like.

A long ceramic member (hereinafter referred to as "ceramic long body") has been produced for use as a ceramic heat transmitting tube of a heat exchanger of a shell-and-tube type or the like. Such a ceramic long body is generally produced by forming a raw material powder into a compact having a predetermined long shape by various kinds of moldings, calcining the compact as. necessary, and firing the calcined ceramic body in such a state that the ceramic body is hung inside a sheath lest the ceramic body should directly touch the sheath.

When a ceramic member is produced, there arises a problem that a slight difference of density inside the compact is prone to deformation of the ceramic body in the firing process. The aforementioned conventional method for producing a ceramic long body has a problem that a ceramic long body is prone to having a warp particularly at the lower side thereof.

The reason the ceramic long body is prone to having a warp particularly at the lower side thereof seems to be as follows:

When the ceramic long body is fired in a state that the ceramic body is hung, the upper part of the ceramic long body is pulled downward by its own weight, and thereby a warp is formed. However, the lower part of ceramic long body hardly has such an inhibitory action. Recently, elongation of a heat transmitting tube has been investigated in developing a ceramic heat exchanger of a shell-and-tube type. Deformation of a ceramic tubular body to be used as a heat transmitting tube is one of impediments to achieving the elongation of the ceramic tubular body.

SUMMARY OF THE INVENTION

The present invention is achieved in consideration of the aforementioned problem. The object of the present invention is to produce a ceramic long body whose deformation is minimized.

In order to achieve the aforementioned object, according to the present invention, there is provided a method for producing a ceramic long body comprising: hanging a ceramic non-sintered body of long shape inside a sheath so that the ceramic body does not touch the sheath; firing the ceramic non-sintered body at a temperature at which the ceramic non-sintered body sinters until the sintering is completed to obtain a sintered ceramic body; hanging the sintered ceramic body upside down; and firing the sintered ceramic body again at a temperature at which the ceramic non-sintered body sinters.

Note that, in the present invention, "a ceramic non-sintered body" includes a green ceramic body and a calcined ceramic body.

Additionally, "sintering is completed" means that the shrinkage of the ceramic non-sintered body reaches 98% of the shrinkage caused until the ceramic non-sintered body becomes a sintered body having a relative density of 100%.

Further, "a ceramic long body" means a ceramic member having the shape of a stick, a tube, or the combination thereof (a shape having both a portion of stick and a portion of tube in one member).

DETAILED DESCRIPTION OF THE INVENTION

Figure 1A:
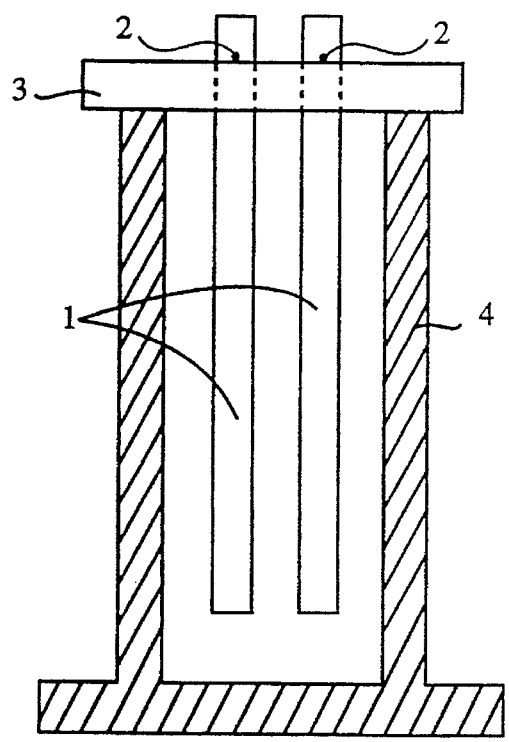
FIGS. 1(a) and 1(b) are explanatory views showing a method for firing ceramic long bodies.

In the present invention, a ceramic non-sintered long body is fired at a temperature at which the ceramic body is sintered until sintering is completed in a state that the ceramic body is hung in a sheath (This step of firing is hereinafter referred to as "first firing."). The sintered body obtained by the first firing has a warp particularly in the lower side. Then, the sintered body is hung upside down and fired again at a temperature at which the sintering is completed (This step of firing is hereinafter referred to as "second firing."). That is, the sintered body obtained by the first firing having a large warp in the lower side is hung upside down so as to have the large warp in the upper side, and the sintered body is subjected to the second firing so that the large warp caused by the first firing is pulled down by its own weight during the second firing, which results in rectifying the large warp.

Since the sintering is completed in the first firing step, the shrinkage is hardly caused by the second firing. Therefore, deformation by the shrinkage can be controlled.

The heating speed (the speed of temperature raise) up to the temperature at which a ceramic body is sintered (temperature to be maintained) in the first firing is preferably as slow as possible. The speed is preferably 200° C./hr or less. When the speed is too fast, the ceramic body is rapidly shrunk, causing not only an increase of deformation but also generation of residual stress, which is not preferable in view of strength.

The heating speed in the second firing is preferably the same as or slower than that of the first firing. The firing temperature in each of the first and second firing is not limited as long as the ceramic body is able to sinter, and it is not required that the firing temperature of the first firing is the same as that of the second firing temperature.

Incidentally, as a method for hanging the ceramic long body, there can be employed a method such as, for example, arranging a throughhole at each end of the ceramic long body, and passing a needle-like pin through the throughhole and the pin is laid on the top of the sheath, or arranging a narrow portion at each end ceramic body, and hanging the ceramic body by the sheath holding the ceramic body narrow portion, etc.

In the present invention, a material powder for the ceramic long body is not limited to an oxide, and the material powder should be suitably chosen depending on the use. For example, when the ceramic long body is used as a heat transmitting tube of a ceramic heat exchanger of a shell-and-tube type, silicon nitride having high strength and high thermal durability is mainly employed as a material.

There is no limitation of the length of the ceramic long body or of the diameters of the throughhole when the ceramic long body is tubular, and these sizes should be suitably selected depending on the use, conditions of when the ceramic body, and the like.

The present invention is hereinbelow described in more detail on the basis of Examples. However, the present invention is not limited to these Examples.

Examples 1–8, Comparative Examples 1–3

To 1000 g of $Si_3N_4$ powder were added 10 g of $Y_2O_3$, 10 g of MgO, and 5 g of $ZrO_2$ as sintering aids, 1g of poly(vinyl alcohol) as an organic binder, and 1000 g of water. The material was ground and mixed for four hours by an attrition mill using $Si_3N_4$ balls (5 mm in diameter). The obtained ground mixture was dried and granulated by means of a spray drier to obtain a starting material powder. The powder was subjected to extrusion molding to form a long compact. The compact was dried at 110° C. for 10 hours, and then calcined at 500° C. for 5hours to remove binder so as to obtain a calcined body. Incidentally, at each end portion of the calcined body was arranged a throughhole to pass a pin for laying on the sheath.

Figure 1B:
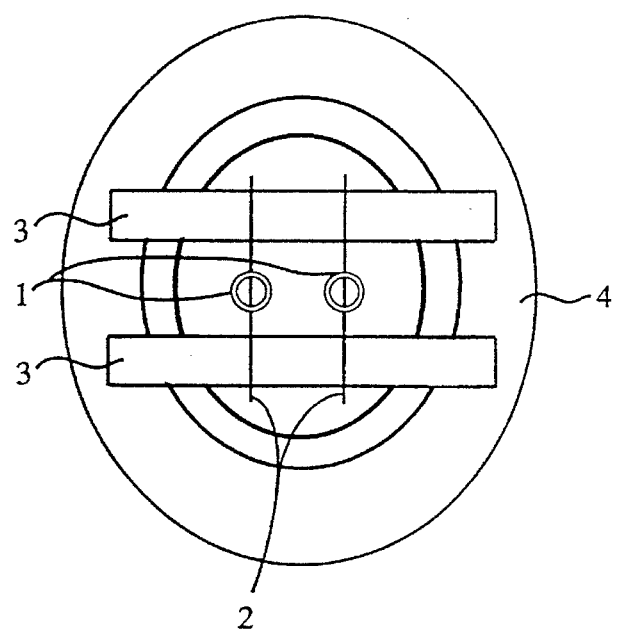

Then, as shown in FIGS. 1(a) and 1(b), a calcined body 1 was set in a sheath 4 and subjected to a first firing in a nitrogen atmosphere in the conditions shown in Table 1. FIG. 1(a) is a side elevation view, and FIG. 1(b) is a top view. That is, two angular sticks 3 were laid on the upper surface of the sheath 4 having a tubular shape with a bottom, a pin 2 was passed through a throughhole arranged at each of the end portion of the calcined body 1, the calcined body 1 was hung in the sheath 4 by setting the pin 2 so that both ends of the pin were placed on the stick 3, and the calcined body 1 is subjected to the first firing.

Figure 2:
FIG. 2 is an explanatory view showing straightness of a ceramic long body.
Figure 3A:
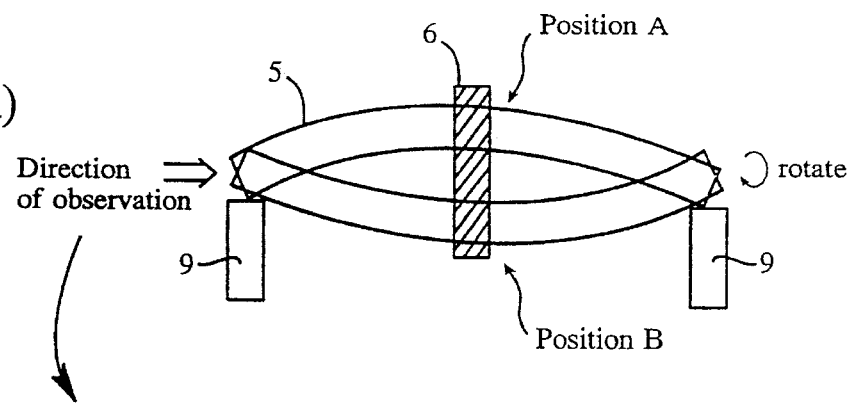
FIGS. 3(a), 3(b), 3(c) and 3(d) are explanatory views showing a method for measuring the straightness of a ceramic long body.
Figure 3B:
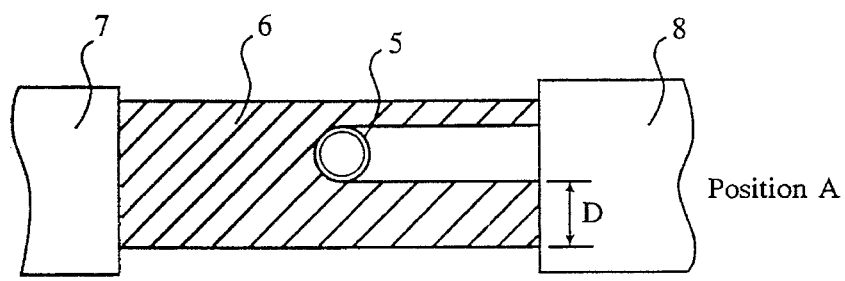
Figure 3C:
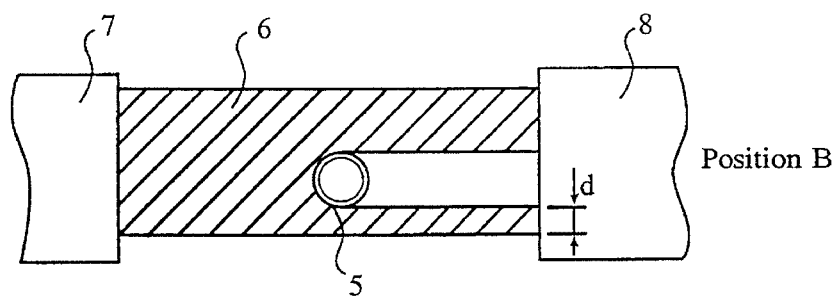
Figure 3D:
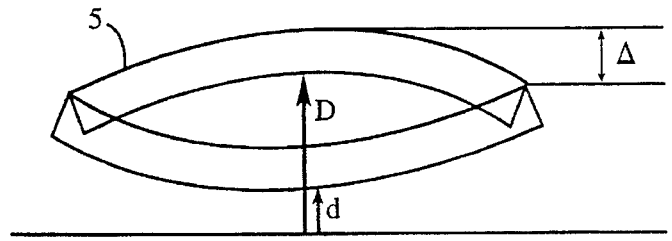

After the first firing, the obtained sintered body was hung upside down and subjected to the second firing in the conditions shown in Table 2(except for Comparative Example 3). The temperatures were maintained for one hour in the first and second firings respectively. Thus, there were obtained tubular ceramic bodies each having an outer diameter of 8 mm, an inner diameter of 6 mm, a length of 600mm (except for a stick-like body in Example 8). In each of Examples and Comparative Examples, ten pieces were measured for straightness, and the average is shown in Table 1. Note that the straightness denotes a degree Δ of a warp of a ceramic long body after sintering as shown in FIG. 2. Specifically, as shown in FIGS. 3(a), 3(b), 3(c) and 3(d), the ceramic long body 5 laid on pedestals 9 between an emitting portion 7 and a receiving portion 8 of laser beams 6 expressed by oblique lines. The ceramic long body 5 was rotated on the pedestals 9. There were obtained the distances D and d from the bottom of the laser beams 6 to the ceramic long body 5 in the position that the deformed portion of the ceramic body 5 became highest (position A) and lowest (position B) respectively. The straightness was obtained by a formula 1 shown below.

Straightness: Δ=(D–d)/2

TABLE 1

| | | Examples | | | | | | | | Comparative Examples | | |
|---|---|---|---|---|---|---|---|---|---|---|---|---|
| | | 1 | 2 | 3 | 4 | 5 | 6 | 7 | 8 | 1 | 2 | 3 |
| First Firing | Speed of temperature raise (°C./hr) | 200 | 200 | 200 | 200 | 50 | 600 | 200 | 200 | 200 | 200 | 200 |
| | Firing temperature (°C.) | 1610 | 1630 | 1650 | 1650 | 1650 | 1650 | 1650 | 1650 | 1500 | 1600 | 1650 |
| | Shrinkage* | 1.33 | 1.33 | 1.34 | 1.34 | 1.34 | 1.33 | 1.34 | 1.34 | 1.27 | 1.30 | 1.33 |
| Second Firing | Speed of temperature raise (°C./hr) | 200 | 200 | 200 | 50 | 50 | 600 | 600 | 200 | 200 | 200 | — |
| | Firing temperature (°C.) | 1650 | 1650 | 1650 | 1650 | 1650 | 1650 | 1650 | 1650 | 1650 | 1650 | — |
| | Shrinkage* | 1.34 | 1.34 | 1.34 | 1.34 | 1.34 | 1.34 | 1.34 | 1.34 | 1.34 | 1.34 | — |
| Straightness (mm) | | 1.7 | 1.5 | 1.4 | 1.2 | 1.0 | 1.9 | 2.2 | 1.5 | 4.5 | 4.0 | 5.6 |

*Shrinkage = length of non-sintered ceramic body/length of fired ceramic body

As obvious from Table 1, the ceramic long bodies obtained in Examples 1–8, which are within the scope of the present invention, are more precise in size and shape with a smaller degree of a warp than those obtained in Comparative Examples 1 and 2, in which sintering of the ceramic bodies was not completed in the first firing because of low firing temperatures, and Comparative Example 3, in which the ceramic bodies were not hung upside down in the second firing as a conventional method. In each of Examples 3, 5, and 6, the first firing and the second firing were conducted under the same conditions (speed of a temperature raise, temperature of firing). The smaller the speed of temperature raise, the better the result. Furthermore, the ceramic long body obtained in Example 4, in which the speed of a temperature raise in the second firing was slower than that in the first firing, had a smaller deformation than the ceramic long body obtained in Example 7, in which the speed of a temperature raise in the second firing was faster than that in the first firing.

As described above, according to the present invention, a ceramic long body having little deformation can be obtained, and the present invention can be suitably employed as a method for producing, for example, a heat transmitting tube of a heat exchanger of a shell-and-tube type.

What is claimed is:

1. A method of producing a ceramic long body comprising:

hanging a long, non-sintered ceramic body in a first substantially vertical direction inside a sheath while maintaining a spacing between the non-sintered ceramic body and the sheath;

firing the hanging ceramic body at a sufficient temperature and for a sufficient time to sinter the ceramic body completely;

hanging the sintered ceramic body in a second substantially vertical direction substantially opposite to said first vertical direction; and firing the hanging sintered ceramic body at least at said sufficient temperature.

2. The method of claim 1, wherein the non-sintered ceramic body is one of a green ceramic body and a calcined ceramic body.

3. The method of claim 1, wherein a heating speed up to said sufficient temperature at which the ceramic body sinters is 200° C./hr or less.

* * * * *